Figure 1:
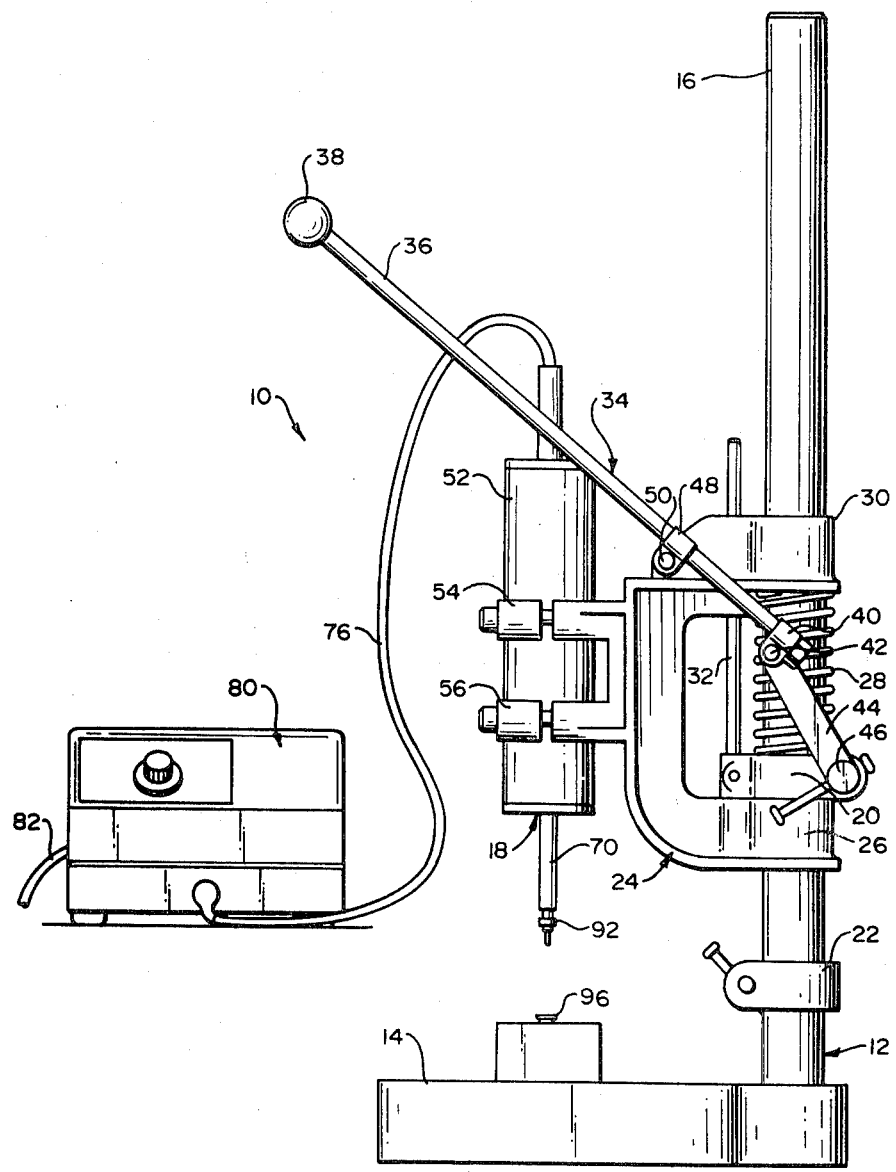

United States Patent [19]

Biggs

[11] 4,455,134

[45] Jun. 19, 1984

[54] THERMAL PRESSES

[75] Inventor: Gordon R. Biggs, Desborough, England

[73] Assignee: C.E.M. Co., Inc., Danielson, Conn.

[21] Appl. No.: 519,101

[22] Filed: Aug. 1, 1983

[30] Foreign Application Priority Data

Aug. 4, 1982 [GB] United Kingdom ............... 82 22548

[51] Int. Cl.³ .................... B29C 3/00; B29C 17/00; B30B 1/04

[52] U.S. Cl. .................... 425/508; 425/517; 425/419; 425/406

[58] Field of Search ............... 425/12, 290, 298, 318, 425/383, 406, 412, 415, 458, 508, 517, 384, 407, 419, 423, 451.1, 451.5, 451.6, 451.9, 589, 593, 594, 595, DIG. 220, DIG. 221, DIG. 223, 409, 411, DIG. 222

[56] References Cited

U.S. PATENT DOCUMENTS

| 789,694 | 5/1905 | Kempshall | 425/517 X |
|---|---|---|---|
| 2,459,205 | 1/1949 | Wells et al. | 425/412 |
| 2,711,567 | 6/1955 | Knapp | 425/595 X |
| 2,889,578 | 6/1959 | Roberts et al. | 425/412 X |
| 3,640,655 | 2/1972 | Wallace | 425/517 X |
| 3,920,368 | 11/1975 | Lemelson | 425/458 X |
| 3,926,356 | 12/1975 | Still | 227/114 |

FOREIGN PATENT DOCUMENTS

| 27001 | of 1899 | United Kingdom | 425/508 |
|---|---|---|---|
| 1415513 | 11/1975 | United Kingdom | 425/508 |
| 1429709 | 3/1976 | United Kingdom | . |
| 1513052 | 6/1978 | United Kingdom | . |

Primary Examiner—J. Howard Flint, Jr.
Attorney, Agent, or Firm—Hayes & Reinsmith

[57] ABSTRACT

A hand-operated thermal press for installing metal inserts in a workpiece of a thermoplastics material comprises a frame (12) including an upright post (16) on which is slidably mounted a support bracket (24) carrying an insert driver (18). Movement of the bracket (24) along the post (16) is limited by adjustable clamps (20, 22) and the bracket (24) is biassed into a starting position by a coil spring (28). A hand-operable mechanism (34) is provided for moving the insert driver (18) along the post (16). The insert driver (18) incorporates a heating unit movable relatively to the insert driver (18) against a biassing spring (100). The heating unit includes a core (70) heated by the unit and which supports a bit (92) adapted to receive the metal insert to be installed. The clamps (20, 22) are adjusted to provide a required movement of the insert driver and the spring bias (100) ensures a consistent driving force for installing the insert.

12 Claims, 4 Drawing Figures

THERMAL PRESSES

This invention generally relates to a thermal press and particularly concerns a hand operated thermal press for installing metal inserts integrally into a thermoplastics workpiece.

A variety of different industrial applications require the insertion of various types of metal fasteners into thermoplastics components with high pull-out resistance, rotational resistance and resistance to vibration and back-out torque. In addition, numerous applications are encountered which additionally require a relatively high degree of uniformity of such fastener insertion wherein metal fittings such as bushes, studs and the like are required to be fully installed in precisely flush relation to an upper surface, e.g. of a thermoplastics component.

The known apparatus for installing metal inserts into thermoplastics material wherein the inserts are heated to cause localized melting and flow of the thermoplastics material to enable insertion to take place are subject to a number of drawbacks, particularly with hand operated insert installation apparatus. For example, certain known apparatus incorporate a head or driver which is reciprocated under manual control toward and away from a thermoplastics component and utilizes both heat, which is imparted to the insert through a mandrel or tip assembly of the tool, and mechanical pressure which is manually applied by the tool operator. As is known, the thermoplastics component is normally temporarily located in a fixed jig or other suitable device. In many such devices, the depth to which the insert is installed is dependent upon operator judgement with varying results in consistency and uniformity of the insert installation. Other devices depend upon sensitive operator judgement as to both the pressure and the timing of the mechanical pressure or driving force to be applied to the insert relative to the condition of the surrounding heated thermoplastics workpiece. Premature application of the insert installation force may result in splitting or cracking, e.g. of a workpiece or undesired introduction of stresses which may later result in a damaged product.

These problems are particularly evident in applications involving workpieces having relatively thin sidewalls surrounding a preformed opening for receiving an insert. Such workpieces are particularly susceptible to an operator imparting an excessive insertion pressure before the workpiece has reached a critical temperature to permit full flow of its thermoplastics material ensuring solid bonding of that material with the insert without creating undesired and unnecessary stresses in the workpiece and concommitant damage later such as splitting of the workpiece shell.

This invention provides a tool which will provide a consistently uniform high quality installation of metal inserts into thermoplastics material once the tool of this invention has been set up for a given job while eliminating heretofore sensitive operator judgement as to the required insert installation driving force and its timing relative to the condition of the workpiece being melted to permit insert penetration.

This invention further provides a tool featuring simplified, fast, trouble-free insert installations of high quality wherein a predetermined insert driving force is effected entirely independently of an operator to fully install each insert to a specified depth in an operation featuring optimized insert installation timing and thus eliminate the inconsistency of installation driving forces and stresses heretofore encountered and introduced by variable installation pressures and premature installations created by an operator.

According to this invention, there is provided a thermal press for installing metal inserts into a workpiece of thermoplastics material and comprising a frame, a bit driver including a heating means, the driver mounted on the frame for reciprocation toward and away from the workpiece between a starting position remotely spaced relative to the workpiece and a ready operative position adjacent the workpiece, a bit supported by the driver for reciprocation toward and away from the workpiece, the bit being adapted to be heated by the heating means and engageable with an insert upon movement of the driver from starting position to said ready operative position for applying heat directly to the insert causing it to locally melt the thermoplastics workpiece, and a bit biassing means for driving the bit independently of the driver when it is in said ready operative position to apply an insert driving force on the bit to fully install the insert into the workpiece upon softening of its thermoplastics material.

This invention also provides an apparatus for performing a method of installing a metal insert into a workpiece of thermoplastics material comprising the steps of positioning a metal insert on the workpiece in alignment with a heated tool bit, heating the insert by moving the heated tool bit into direct engagement with the insert, and activating an automatically operable tool bit biassing mechanism and exerting a driving force therewith to the tool bit and the insert simultaneously upon moving the tool bit into direct engagement with the insert, and thereafter driving the insert into the workpiece solely under the driving force of the tool bit biassing mechanism upon melting of the thermoplastics material surrounding the heated insert.

Figure 2:
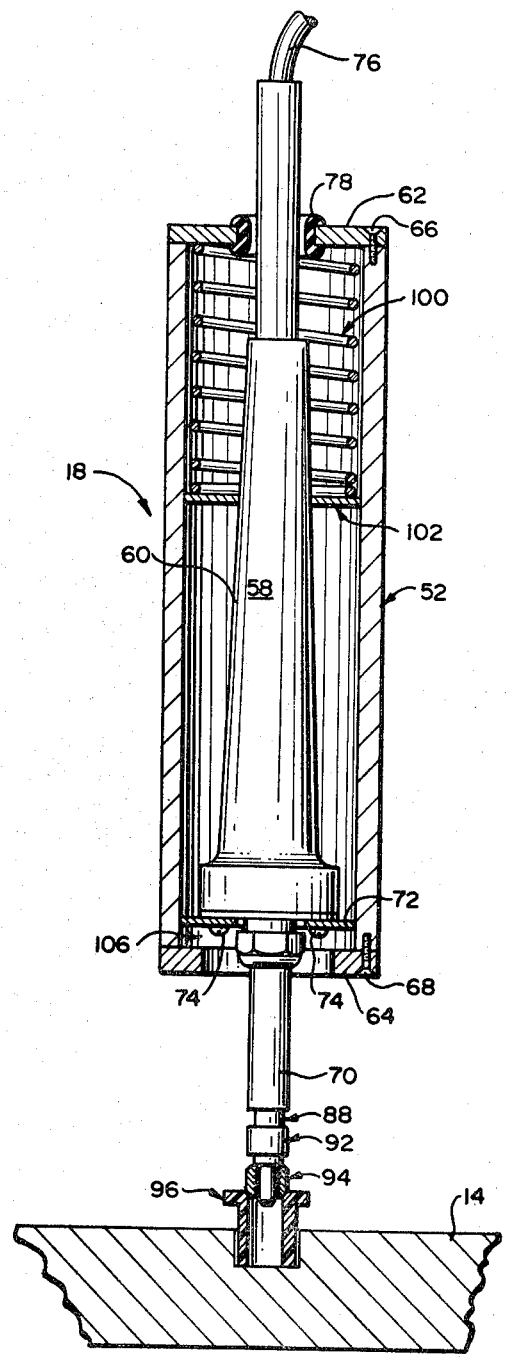
Figures 3, 4:
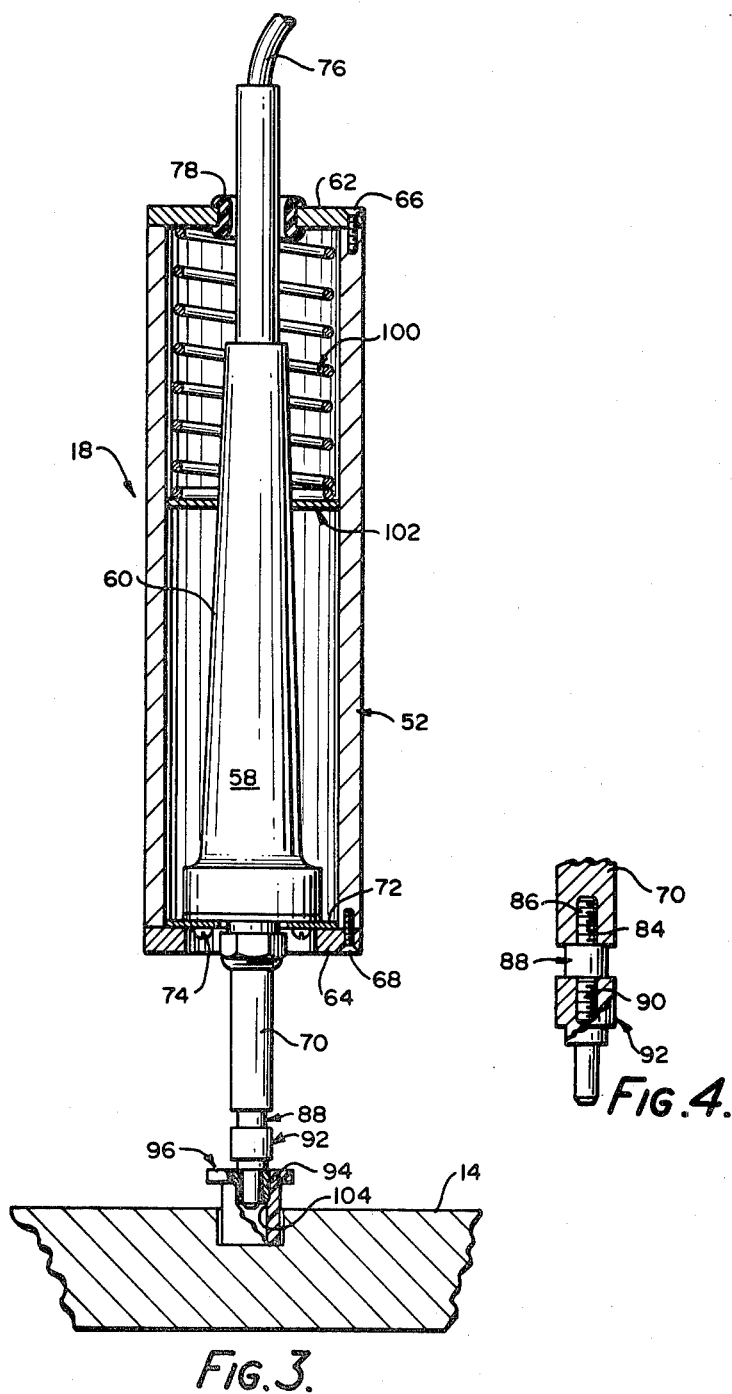

A preferred embodiment of the invention will now be described, by way of example, with reference to the accompanying drawings, in which:

FIG. 1 is an isometric view of a thermal press incorporating this invention,

FIG. 2 is a side view, partly broken away and partly in section, showing a heat insert driver of the tool of FIG. 1 in a ready operative position with its bit in an insert engagement position relative to a metal insert which is to be driven into a thermoplastics workpiece, FIG. 3 is a view similar to FIG. 2 showing the bit in a fully extended position with the insert seated in flush relation to a thermoplastics workpiece, and FIG. 4 is a side view, partly broken away and partly in section, showing a tip assembly of the tool of FIG. 1.

Referring now to the drawings in detail, a thermal press, generally designated 10, has a bench stand 12 with a base 14 and upright post 16 fixed to base 14. A bit heat driver or insert driver is generally designated by the reference numeral 18 and is supported for reciprocable movement on post 16 along a vertical axis between upper and lower adjustment clamps 20, 22 which establish upper and lower stroke limit positions of driver 18. Driver 18 has a mounting bracket 24 supported for vertical sliding movement on post 16 between its starting position (illustrated in FIG. 1) established by engagement of a lower collar 26 of the mounting bracket 24 with the upper clamp 20, and a ready operative position defined by engagement of the lower collar 26 of the mounting bracket 24 with the lower clamp 22. Upper and lower clamps 20, 22 are adjustably secured in preselected positions on post 16 of the bench stand 12. A spring 28 is illustrated as being coiled about post 16 with a lower end of the spring 28 seated on the upper adjustment clamp 20 and an upper end of the spring 28 engaging an upper collar 30 of the driver mounting bracket 24 for effecting return of driver 18 into its illustrated starting position. For ensuring precise vertical reciprocation of the driver 18, a guide 32 is vertically secured in the upper adjustment clamp 20 to extend through a guide opening, not shown, in the upper collar 30 of the driver mounting bracket 24.

For reciprocating driver 18 between its starting and ready operative positions, any suitable means may be utilized including a hand operated crank mechanism 34 illustrated in FIG. 1. Crank mechanism 34 includes a drive lever 36 having an operating knob 38 at its free end and connected at its opposite end by a link 40 secured by pin 42 to a pivot arm 44 which, in turn, is pivotally supported on a horizontally extending arm 46 of the fixed upper adjustment clamp 20 secured to post 16. Lever 36 is secured intermediate its ends to a second link 48 which is supported by pin 50 for pivoting movement on mounting bracket 24 adjacent its upper collar 30.

Accordingly, driver 18 may be manually driven vertically downwardly toward the base 14 of bench stand 12 upon depressing lever 36 of its crank mechanism 34 to drive mounting bracket 24 against the force of its return spring 28 and into engagement with lower adjustment clamp 22 fixed to the upright post 16 of stand 12. Upon release of lever 36, the spring 28 automatically ensures return of the driver 18 into starting position with the lower collar 26 of its mounting bracket 24 once again engaged against the upper adjustment clamp 20 fixed on post 16.

As seen in FIG. 1, heat insert driver 18 additionally includes a cylindrical housing 52, preferably formed of a suitable metal, which is secured to mounting bracket 24 by any suitable means such as illustrated clamps 54 and 56 which releasably secure housing 52 in precisely vertically disposed relation.

In accordance with one aspect of this invention, heat insert driver 18 incorporates a heating unit comprising a conventional electrical soldering unit 58 (FIGS. 2 and 3) coaxially supported for reciprocation within the cylindrical housing 52 along an axis of movement coincident with the axis of movement of the heat insert driver cylinder 52. The soldering unit 58 will be understood to have a body formed of suitable insulation material providing both thermal and electrical insulation.

As best seen in FIGS. 2 and 3, opposite ends of housing 52 are provided with centrally apertured end caps 62 and 64 which may be secured in any suitable manner such as by fasteners 66 and 68. The soldering unit 58 has a standard electrical heating element, not shown, which may be thermostatically controlled, and an axially extending elongated core 70 formed of material of high thermal conductivity and adapted to be heated by the heating element. The core 70 is illustrated as protruding coaxially below the lower housing end cap 64. The heating core 70 is of reduced diameter relative to the body 60 of the soldering unit 58 and will be understood to be secured in thermally conductive relation to its heating element in a suitable conventional manner. The lower end of the soldering unit body 60 is of enlarged diameter and is fitted with an annular plate 72 secured to the soldering unit 58 by fasteners 74 and received within the confines of the housing 52 for reciprocable movement in unison with the heating unit 58. Electrical leads to the heating element are provided in cord 76 trained through the upper end of body 60 and through a seal 78 fitted within a central opening of the upper housing end cap 62 to a power and temperature control unit 80 (FIG. 1) which, in turn, has a power cord 82 connected to a suitable source of electrical power, not shown. The control unit 80 is of any conventional type adapted to selectively set the thermostatically controlled heating element of the heating unit 58 and preferably provides a visual readout of the heating element temperature converted to a tip temperature for selectively establishing a desired insert installation temperature.

As best seen in FIG. 4, the core 70 of heating unit 58 has an internally threaded opening 84 at its tip for securing an externally threaded end 86 of a heat sink adapter 88 which is illustrated as having an enlarged intermediate collar and an opposite threaded end 90 of reduced diameter for securing a heat sink insertion bit 92. The latter is formed of a material of high thermal conductivity, as is the adapter 88, so as to be suited to be electrically heated by core 70. By such construction, it will be seen that bit 92 is adapted to be heated by the heating element via core 70 and its adapter 88 for in turn heating a metal insert 94 preliminary to its installation in a thermoplastics workpiece 96. As will be appreciated by those skilled in the art, the bit 92 is configured to engage a central bore, e.g. of an insert, and the disclosed construction is particularly suited to interchange bits of different size and shape for applications with various insert sizes and shapes. The operating cycle time for a given insert installation will likewise vary, depending on the type of thermoplastic utilized in the workpiece, the size of the insert, the heat sink temperature and the applied insert installation pressure.

Also in accordance with this invention, the sensitive operator judgement, normally required for applying the installation pressure in timed relation to the rate of local melting of the workpiece 96 which is required to fully install an insert, is completely eliminated by the provision of a yieldable biasing mechanism for driving bit 92 independently of driver 18 during the actual insert penetration into the workpiece 96. Such insert installation is effected in timed relation precisely with an optimized condition of various types of thermoplastics materials which are to be penetrated by a given size insert under a preselected installation pressure. More specifically, a coil compression spring 100 is received within cylinder housing 52 with opposite ends of spring 100 seated against the upper cylinder end cap 62 and a drive surface of the heating unit 58. In the specifically illustrated embodiment, an apertured annular plate 102 comprises the drive surface and is secured under spring force intermediate the ends of the heating unit body 58 which is illustrated as being of circular cross-section and tapered toward an upper end of the body.

By such construction, the heating unit 58, including its adapter 88 and bit 92, will normally be in a fully extended position (FIG. 3) with the lower cylinder end cap 64 serving as a stop for the radial flange or plate 72 at the base of the heating unit body 58. During set-up for a given job, the manual crank mechanism 34 is operated by grasping the lever 36 and pulling it downwardly to a desired height corresponding to the maximum depth required in a given insert installation, depending on the height of the insert relative to the upper surface of the thermoplastics workpiece, and the level or height of the tip of the bit 92 at its fully extended position required in relation to the workpiece 96 to precisely set the insert 94 in installed position at the desired depth. The maximum throw establishing this predetermined required level of the tip of the insertion bit 92 is accordingly selectively established relative to the desired height to which a fitting, stud or other type insert is desired to be driven into the thermoplastics workpiece 96. Thereafter, the lower clamp 22 is secured in an adjusted position on post 16 to engage the lower collar 26 of the mounting bracket 24 establishing a repeatable maximum throw limit position of the heat insertion bit 92 for a given job, and the upper bracket 20 is adjusted on post to permit the heat insert driver 18 to be returned under the influence of its spring 28 to a desired upper limit starting position.

Accordingly, with control unit 80 energized and the readout providing a desired bit tip temperature, an insert 94 is located on workpiece 96 in coaxial alignment with the axis of movement of the overlying insertion bit 92, preferably positioned in a preformed opening in workpiece 96 such as illustrated at 104 in FIG. 3. The heat insert driver 18 is then manually driven from its starting position (FIG. 1) into its lowermost ready operative position (FIGS. 2 and 3) by manual actuation of crank lever 36. This action causes bit 92 to be driven into intimate heat transfer relation to the metal insert 94 which is resting on the cold thermoplastics workpiece 96 and against the biassing force of spring 100 whereupon further movement of bit 92 is arrested and the spring biassing force is manually overcome by continued movement of cylindrical housing 52 relative to the heating unit 58 into the ready operative position of the driver 18. The travel of the driver housing 52 is arrested upon engagement of lower collar 26 against the lower clamp 22 on post 16 establishing the ready operative position of the driver 18 and creating a gap 106 (FIG. 2) between the stop members 72 and 64 of the heating unit 58 and housing 52, respectively.

Such action accordingly activates the bit biassing mechanism in accordance with the invention to exert a preselected spring force axially on heating unit 58 for effecting a controlled driving insert installation pressure on the insert 94 being heated by bit 92 which is in intimate heat transfer relation to the insert to be installed. As the material of the thermoplastics workpiece 96 surrounding the insert 94 melts from the concentrated heat flow emanating from the bit 92 and its engaged insert 94, the heating unit 58 including its core 70, adapter 88 and bit 92 are automatically driven in unison downwardly under a uniformly controlled force to install insert 94 into the thermoplastics workpiece 96 which, upon reaching a critical temperature to ensure optimum material flow, is penetrated at a consistently uniform rate to fully seat each insert in flush relation, e.g. with the upper surface of the workpiece. As will be appreciated, the heating unit, its core, adapter and bit are automatically and uniformly driven by the preselected force of the biassing spring 100 downwardly relative to the cylinder housing 52, which is maintained in its ready operative position by engagement of its lower mounting bracket collar 26 against the lower post clamp 22 under control of the depressed lever 36, until the movement of the heating unit 58 is arrested by engagement of its stop member 72 with the lower cylinder end cap 64 whereupon the movement of the insertion bit 92 and insert 94 is likewise arrested.

Such action automatically ensures consistent application of insert installation pressure for a given job with the concomitant advantages of filling the external surface interstices of each insert by the melted thermoplastics material without inducing premature undesired mechanical pressure which may later cause splitting of the workpiece or other stresses which may result in damage to the completed product.

Upon observing the arrest of the movement of the bit 92 and insert 94, an operator need only permit the crank lever 36 to return into its starting position in readiness for the next operating cycle. Thereafter, the workpiece 96 cools and resolidifies to secure insert 94 in a strong, permanently embedded installation. No need whatsoever is required on the part of the operator to apply any sensitive judgement as to the pressure required or the timing for penetration of the insert 94 once the thermal press 10 of this invention is set up for a given job. If any failure of the heating unit 58 should occur, it is only necessary to remove the upper cylinder end cap 62 and bit biassing spring 100, whereupon the heating unit 58 in its entirety may be readily withdrawn from the cylindrical housing 52 of the insert driver 18 and replaced, if desired, with a new heating unit and thereafter provided with an appropriate adapter and insertion bit for a given insert installation job.

I claim:

1. A thermal press for installing metal inserts into a workpiece of thermoplastics material and comprising a frame, a bit driver including a heating means and a housing supporting the heating means for relative reciprocation, the driver and housing mounted on the frame for reciprocation toward and away from the workpiece between a starting position remotely spaced relative to the workpiece and a ready operative position adjacent the workpiece, adjustment means on the frame for selectively establishing throw limit positions of the driver and housing in said starting and ready operative positions, the heating means including a bit adapted to be heated by the heating means, the bit being engageable with an insert upon movement of the driver from starting position to said ready operative position for applying heat directly to the insert causing it to locally melt the thermoplastics workpiece, and a bit biassing means for driving the bit from an insert engagement position to a fully extended position independently of the driver when movement of the driver is arrested in said ready operative position, thereby to apply an insert driving force on the bit to fully install the insert into the workpiece upon softening of its thermoplastics material, the housing having a stop member engageable with the heating means to establish the fully extended position of the bit under the driving influence of the biassing means.

2. The press of claim 1 wherein insert engagement by the bit arrests its movement to establish said insert engagement position of the bit prior to the arrest of driver movement in one linear direction from its starting position into said ready operative position, and wherein continued movement of the driver in said one linear direction into its ready operative position after arrest of the bit in its insert engagement position activates the bit biassing means for driving the bit independently of the driver.

3. The press of claim 1 wherein the bit is retracted relative to the driver in its ready operative position, the bit in its fully extended position causing the insert to be completely seated in flush relation to the workpiece.

4. The press of claim 3 wherein the bit is automatically driven into its insert engagement position against the force of the biassing means upon movement of the driver from starting position into ready operative position to condition the biassing means to drive the bit into fully extended position entirely independently of the driver which remains in its ready operative position during the throw of the bit under the influence of the bit biassing means from said insert engagement position to said fully extended position of the bit.

5. The press of claim 4 further including manual operating means drivingly connected to the driver for moving it between its starting position and its ready operative position, the biassing means being manually overridden upon movement of the driver into its ready operative position.

6. The press of claim 1 further including return means cooperating with the frame and the driver for continuously urging the driver into its starting position.

7. The press of claim 1 or 2 or 3 or 4 or 5 or 6 wherein the biassing means comprises mechanical spring means continuously urging the bit toward its fully extended position.

8. The press of claim 1 wherein the heating means comprising a soldering unit having an insulated body providing heating and electrical insulation and mounted for reciprocating movement within the housing, the soldering unit having an electrical heating element and a core in thermal conducting relation thereto adapted to be heated by the heating element and protruding axially beyond the housing with the bit being fixed to the tip of the core in thermal conducting relation thereto.

9. The press of claim 8 wherein the soldering unit is replaceable as a unit in its entirety in the driver housing.

10. The press of claim 8 wherein the soldering unit includes a drive surface thereon, and wherein the biassing means acts to apply an insert installation driving force to said drive surface to move the heating means and the bit in unison relative to the housing between said insert engagement position and said fully extended position of the bit, independently of the driver and housing.

11. The press of claim 1 wherein the heating means includes a drive surface thereon, and wherein the biassing means acts to apply its biassing force to the drive surface of the heating means to move the heating means and the bit in unison relative to the housing between said insert engagement position and said fully extended position of the bit, independently of the driver and housing.

12. The press of claim 10 or 11 wherein the biassing means comprises a coil spring having opposite ends seated against the housing and said drive surface of the heating means.

* * * * *